(12) United States Patent
Hashimoto

(10) Patent No.: US 11,161,499 B2
(45) Date of Patent: Nov. 2, 2021

(54) VEHICLE DRIVING ASSISTANCE DEVICE

(71) Applicant: ADVICS CO., LTD., Kariya (JP)

(72) Inventor: Yosuke Hashimoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 427 days.

(21) Appl. No.: 16/313,730

(22) PCT Filed: Jun. 26, 2017

(86) PCT No.: PCT/JP2017/023326
§ 371 (c)(1),
(2) Date: Dec. 27, 2018

(87) PCT Pub. No.: WO2018/003717
PCT Pub. Date: Jan. 4, 2018

(65) Prior Publication Data
US 2019/0168745 A1 Jun. 6, 2019

(30) Foreign Application Priority Data
Jun. 28, 2016 (JP) .............................. JP2016-127609

(51) Int. Cl.
*B60W 30/045* (2012.01)
*B60T 8/1755* (2006.01)
(Continued)

(52) U.S. Cl.
CPC ......... *B60W 30/045* (2013.01); *B60T 8/1755* (2013.01); *B60W 10/16* (2013.01);
(Continued)

(58) Field of Classification Search
CPC .. B60W 30/045; B60W 10/188; B60W 10/16; B60W 10/18; B60W 50/082;
(Continued)

(56) References Cited
U.S. PATENT DOCUMENTS

2005/0236895 A1* 10/2005 Matsumoto ......... B60T 8/17557
303/140
2012/0179349 A1* 7/2012 Yamakado .......... B60W 10/184
701/89
(Continued)

FOREIGN PATENT DOCUMENTS

JP 2010-188928 A 9/2010

OTHER PUBLICATIONS

International Search Report dated Aug. 29, 2017 in PCT/JP2017/023326 filed Jun. 26, 2017.

*Primary Examiner* — Nadeem Odeh
(74) *Attorney, Agent, or Firm* — Oblon, McClelland, Maier & Neustadt, L.L.P.

(57) ABSTRACT

During vehicle turning, during which a behavior stabilization control is not carried out, a vehicle driving assistance device carries out a turning assist control including: yaw moment control for increasing the amount of drive torque distributed to a drive wheel that, among two left and right drive wheels of the vehicle, is on the outer side of the turn by imparting braking torque to the drive wheel that is on the inner side of the turn; and a deceleration control for decelerating the vehicle. At this time, the driving assistance device calculates a control moment amount and calculates a control deceleration amount on the basis of a travel mode selected by operation of an operation unit.

8 Claims, 4 Drawing Sheets

(51) Int. Cl.
*B60W 10/188* (2012.01)
*B60W 10/16* (2012.01)
*B60W 10/18* (2012.01)

(52) U.S. Cl.
CPC .......... *B60W 10/18* (2013.01); *B60W 10/188* (2013.01); *B60T 2201/14* (2013.01)

(58) Field of Classification Search
CPC ..... B60W 10/20; B60W 30/02; B60T 8/1755; B60T 2201/14
USPC .......................................................... 701/70
See application file for complete search history.

(56) References Cited

U.S. PATENT DOCUMENTS

2015/0175196 A1\* 6/2015 Ohmura ................ B60T 8/1755
 701/42
2018/0297594 A1\* 10/2018 Takahashi ............ G05D 1/0246

\* cited by examiner

| TRAVEL MODE | STEERING DEVICE STEERING REACTION FORCE | DAMPER DEVICE DAMPING FORCE |
|---|---|---|
| SNOW MODE | SMALL | SMALL |
| NORMAL MODE | MEDIUM | MEDIUM |
| SPORT MODE | LARGE | LARGE |

VEHICLE DRIVING ASSISTANCE DEVICE

TECHNICAL FIELD

The present invention relates to a vehicle driving assistance device that executes a turning assist control for assisting turning of a vehicle.

BACKGROUND ART

PTL 1 discloses an example of the vehicle driving assistance device that executes a yaw moment control for increasing a drive torque transmitted to drive wheels on an outer side when turning among both right and left drive wheels, as a turning assist control. In the device disclosed in Patent Document 1, the yaw moment control according to a travel mode selected by an occupant of a vehicle is executed.

CITATION LIST

Patent Literature

PTL 1: JP-A-2010-188928

SUMMARY OF INVENTION

Technical Problem

Although Patent Document 1 discloses that the content of the yaw moment control is changed according to the selected travel mode, the specific content thereof is not disclosed.

An object of the invention is to provide a vehicle driving assistance device capable of suppressing deterioration of drivability during execution of a turning assist control.

Solution to Problem

A vehicle driving assistance device for solving the above-described problem is a vehicle driving assistance device which is applied to a vehicle in which a vehicle control is performed according to a travel mode selected by operation of an operation unit among a plurality of travel modes. The vehicle driving assistance device includes a first control unit which executes a behavior stabilization control for enhancing stability of a behavior of the vehicle when the behavior of the vehicle becomes unstable at the time of turning of the vehicle; and a second control unit which executes a turning assist control including a yaw moment control for increasing a distribution amount of drive torque to drive wheels on an outer side when turning by imparting braking torque to drive wheels on an inner side when turning, among both right and left drive wheels of the vehicle, at the time of vehicle turning in which the behavior stabilization control is not executed, and a deceleration control for decelerating the vehicle. The second control unit sets an increase amount of the braking torque to be imparted to the drive wheels on the inner side when turning due to the execution of the yaw moment control, and the vehicle deceleration amount due to the execution of the deceleration control, on the basis of the travel mode selected by the operation of the operation unit.

According to the above-described configuration, when the turning assist control is executed at the time of turning of the vehicle at which the behavior stabilization control is not executed, the yaw moment of the vehicle is increased by the yaw moment control, while reducing the vehicle body speed of the vehicle by the deceleration control. Therefore, it is possible to properly assist the turning of the vehicle. Moreover, in the above-described configuration, the increase amount of the braking torque to be imparted to the drive wheels on the inner side when turning due to the execution of the yaw moment control, and the vehicle deceleration amount due to the execution of the deceleration control are set on the basis of the travel mode selected by the operation of the operation unit provided by an occupant of the vehicle. That is, it is possible to set the decrease amount of the vehicle body speed of the vehicle due to the execution of the deceleration control, and the increase amount of the yaw moment due to the execution of the yaw moment control to the amounts according to the selected travel mode. Therefore, it is possible to suppress deterioration of drivability during execution of the turning assist control.

For example, the second control unit may set a distribution coefficient according to the travel mode selected by the operation of the operation unit, and the second control unit may increase the increase amount of the braking torque to be imparted to the drive wheels on the inner side when turning due to the execution of the yaw moment control, and may decrease the vehicle deceleration amount due to the execution of the deceleration control, as the distribution coefficient is large. According to this configuration, by increasing the distribution coefficient, it is possible to increase the increase amount of the yaw moment due to the execution of the yaw moment control and to reduce the decrease amount of the vehicle body speed of the vehicle due to the execution of the deceleration control. Further, by reducing the distribution coefficient, it is possible to reduce the increase amount of the yaw moment due to the execution of the yaw moment control and to increase the decrease amount of the vehicle body speed of the vehicle due to the execution of the deceleration control.

Incidentally, in a case where the travel mode selected by the operation of the operation unit is a mode suitable for high-speed traveling as compared to the other travel modes that are not selected, the driver may not want to greatly reduce the vehicle body speed when turning the vehicle. Therefore, in the above-described vehicle driving assistance device, when the travel mode selected by the operation of the operation unit is a mode suitable for high-speed traveling as compared to other travel modes which are not selected, the second control unit desirably sets the increase amount of the braking torque imparted to the drive wheels on the inner side when turning due to the execution of the yaw moment control to be greater than those in a case where the other travel modes are selected, and sets a vehicle deceleration amount due to the execution of the deceleration control to be smaller than those in a case where the other travel modes are selected.

According to the above-described configuration, when the travel mode suitable for high-speed traveling as compared with other travel modes is selected, even if the turning assist control is executed at the time of turning of the vehicle, the vehicle body speed of the vehicle is difficult to decrease. Moreover, in this case, since the increase amount of the yaw moment due to the execution of the yaw moment control is greater than those in a case where the other travel modes are selected, even if the vehicle body speed is not reduced so much, the turning of the vehicle is appropriately assisted by the execution of the turning assist control. Therefore, it is possible to assist the turning of the vehicle, while maintaining the vehicle traveling according to the travel mode selected by the driver.

Further, in a case where the travel mode selected by the operation of the operation unit is a mode suitable for traveling on a low μ road as compared to the other travel modes that are not selected, the road surface on which the vehicle travels may be a low μ, road such as a snowy road. In this way, in a case where the vehicle turns on the low μ road, if the distribution amount of the drive torque to the drive wheels on the outer side when turning is increased by the imparting of the braking torque to the drive wheels on the inner side when turning, the yaw moment of the vehicle becomes too large, so that there is a risk of deterioration of the stability of the vehicle behavior. Therefore, in the vehicle driving assistance device, when the travel mode selected by the operation of the operation unit is a mode suitable for traveling on a low μ road as compared to the other travel modes that are not selected, the second control unit preferably sets the increase amount of the braking torque imparted to the drive wheels on the inner side when turning due to the execution of the yaw moment control to be smaller than those in a case where the other travel modes are selected, and sets the vehicle deceleration amount due to the execution of the deceleration control to be greater than those in a case where the other travel modes are selected.

According to the above-described configuration, when the travel mode suitable for traveling on the low μ road as compared with other travel modes is selected, the increase amount of the yaw moment due to the execution of the yaw moment control becomes difficult to increase. Therefore, even if the turning assist control is executed at the time of turning of the vehicle, a situation, in which the yaw moment of the vehicle becomes too large and the behavior of the vehicle becomes unstable, is suppressed. Moreover, in this case, it is possible to greatly reduce the vehicle body speed of the vehicle by the deceleration control. Therefore, when the vehicle turns on the low μ road, the vehicle can be appropriately turned by sufficiently reducing the vehicle body speed of the vehicle by the execution of the turning assist control.

DESCRIPTION OF EMBODIMENTS

An embodiment of a vehicle driving assistance device will be described below with reference to FIGS. 1 to 5.

Figure 1:
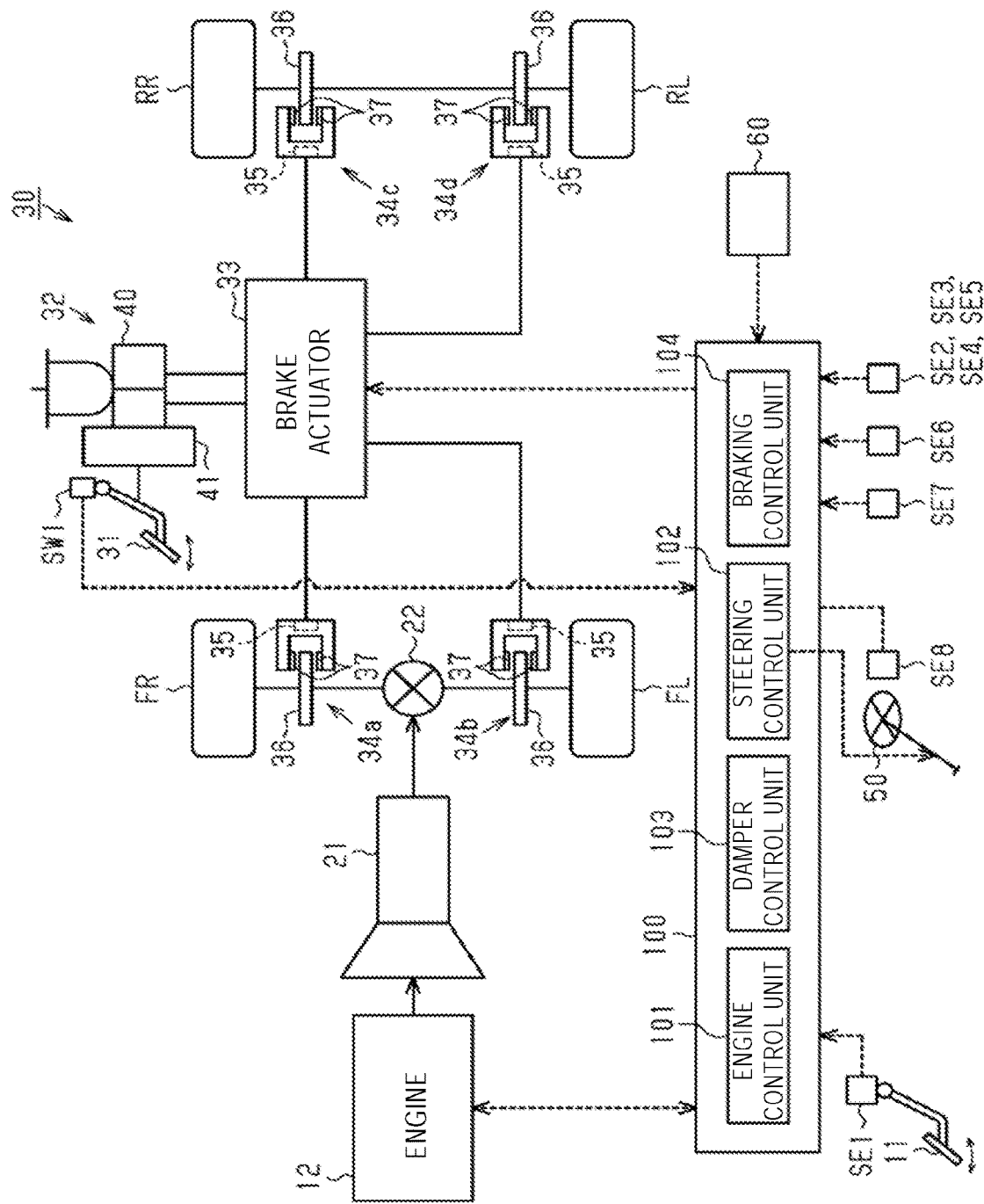
FIG. 1 is a configuration diagram illustrating an outline of a vehicle equipped with a vehicle driving assistance device according to an embodiment.

FIG. 1 illustrates a vehicle equipped with a control device 100 which is an example of the vehicle driving assistance device. As illustrated in FIG. 1, the vehicle is a front-wheel drive vehicle having a plurality of (four in this embodiment) wheels (a right front wheel FR, a left front wheel FL, a right rear wheel RR, and a left rear wheel RL). In the vehicle, when a steering wheel 50 is operated by a driver, the front wheels FR and FL which are also steered wheels are steered according to a steering direction, and the vehicle turns.

The vehicle also includes an engine 12 that is an example of a power source that generates a drive torque according to an amount of operation of an accelerator pedal 11 provided by the driver. The drive torque which is output from the engine 12 is distributed and transmitted to the right and left front wheels FR and FL which are drive wheels via an automatic transmission 21 and a differential gear 22.

A braking device 30 of the vehicle includes a hydraulic pressure generating device 32 connected to a brake pedal 31, and a brake actuator 33. Wheel cylinders 35 of brake mechanisms 34a, 34b, 34c and 34d provided on the wheels FR, FL, RR and RL are connected to a hydraulic circuit of the brake actuator 33. In addition to the wheel cylinders 35, the brake mechanisms 34a to 34d have a disc rotor 36 that rotates integrally with the wheels FR, FL, RR and RL, and a brake pad 37 which is pressed against the disc rotor 36 by the force according to the wheel cylinder pressure which is a liquid pressure in the wheel cylinder 35.

The hydraulic pressure generating device 32 has a master cylinder 40 and a booster 41. The master cylinder 40 generates a master cylinder pressure which is a brake fluid pressure according to the operating force assisted by the booster 41. At this time, the brake fluid is supplied from the hydraulic pressure generating device 32 to the wheel cylinder 35 via the hydraulic circuit of the brake actuator 33. Then, the brake mechanisms 34a to 34d impart a braking torque according to the wheel cylinder pressure in the wheel cylinder 35 to the wheels FR, FL, RR and RL.

The brake actuator 33 is configured so that the braking torque can be applied to the wheels FR, FL, RR and RL, that is, the wheel cylinder pressure in each wheel cylinder 35 can be adjusted, even in a case where the driver is not performing the brake operation.

Further, the vehicle is provided with an operation unit 60 which is operated to select one of a plurality of travel modes prepared in advance (three in this embodiment), and the operation unit 60 is electrically connected to the control device 100 of the vehicle. Further, the control device 100 is configured to perform a vehicle control according to the travel mode selected by the operation of the operation unit 60.

Figures 2, 3:
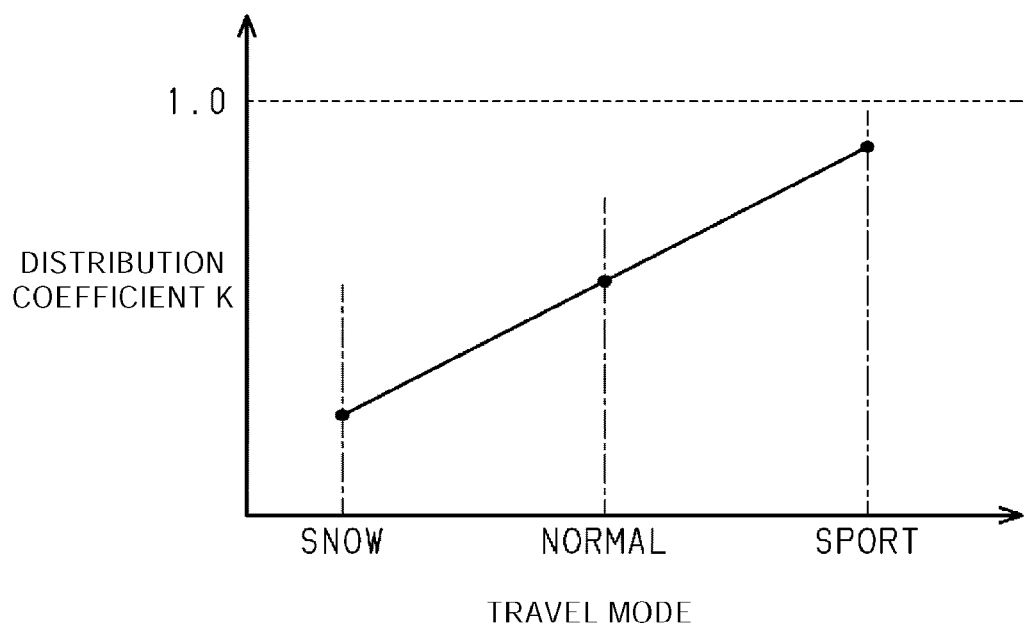
FIG. 2 is a table showing features of all selection modes selectable by a driver in the vehicle equipped with the vehicle driving assistance device.
FIG. 3 is a map showing a relation between a selection mode and a distribution coefficient in the vehicle driving assistance device.

In FIG. 2, three travel modes selectable by operating the operation unit 60 are illustrated. As illustrated in FIG. 2, in this embodiment, on the basis of the selected travel mode, the steering reaction force which is the reaction force of the steering wheel 50 in the steering device, and the damping force of each damper device individually provided in each of the wheels FR, FL, RR and RL are varied. Specifically, a "NORMAL mode" is a mode selected when the vehicle is driven normally, and the "NORMAL mode" is selected as the travel mode in an initial state immediately after a startup switch of the vehicle is turned on. In addition, a "SPORT mode" is a mode suitable for high-speed traveling as compared to other modes (in this case, the "NORMAL mode" and a "SNOW mode"). That is, in a case where the "SPORT mode" is selected as the travel mode, the steering reaction force and the damping force are made larger than those in a case where other modes are selected. In addition, the "SNOW mode" is a mode suitable for traveling on a low μ road such as snowy roads as compared to other modes (in this case, the "SPORT mode" and the "NORMAL mode"). That is, in a case where the "SNOW mode" is selected as the travel mode, the steering reaction force and the damping force are set to be smaller than those in a case where other modes are selected.

As illustrated in FIG. 1, an accelerator opening degree sensor SE1, wheel speed sensors SE2, SE3, SE4 and SE5, a lateral acceleration sensor SE6, a yaw rate sensor SE7, a steering angle sensor SE8, and a brake switch SW1 are electrically connected to the control device 100. The accelerator opening degree sensor SE1 detects the operation amount of the accelerator pedal 11 (that is, the accelerator opening degree). The wheel speed sensors SE2 to SE5 are provided for each of the wheels FR, FL, RR and RL to detect a wheel speed VW which is a rotational speed of the corresponding wheel. The lateral acceleration sensor SE6 detects a lateral acceleration Gy of the vehicle, and the yaw rate sensor SE7 detects a yaw rate γ of the vehicle. The steering angle sensor SE8 detects a steering angle Str of the steering wheel 50, and the brake switch SW1 detects the presence or absence of operation of the brake pedal 31.

Further, the control device 100 has an engine control unit 101 that controls the engine 12, a steering control unit 102 that controls the steering device, a damper control unit 103 that controls each damper device, and a braking control unit 104 that controls the brake actuator 33 of the braking device 30. Each of the control units 101 to 104 can transmit and receive various kinds of information to and from each other.

The engine control unit 101 controls the driving of the engine 12 on the basis of the accelerator opening degree or the like detected by the accelerator opening degree sensor SE1. Further, the steering control unit 102 controls the steering reaction force according to the travel mode selected by the operation of the operation unit 60. In addition, the damper control unit 103 controls the damping force according to the travel mode selected by the operation of the operation unit 60.

The braking control unit 104 is adapted to perform various controls at the time of traveling of the vehicle. That is, in a case where the stability of the behavior of the vehicle deteriorates at the time of turning of the vehicle, that is, in a case where an understeering occurs in the vehicle or an oversteering occurs, the braking control unit 104 executes a behavior stabilization control (also referred to as a "side-slip prevention control") which individually controls the braking torques imparted to each of the wheels FR, FL, RR and RL to enhance the stability of the vehicle. Further, the braking control unit 104 sometimes executes a turning assist control which assists turning of the vehicle at the time of turning of the vehicle at which the behavior stabilization control is not executed.

Further, the turning assist control includes a yaw moment control which increases the distribution amount of the drive torque to the drive wheels on the outer side when turning, by imparting the braking torque to the drive wheels on the inner side when turning, among the both right and left drive wheels (the right and left front wheels FR and FL in this embodiment) of the vehicle, and a deceleration control which decelerates the vehicle. Further, although described in detail later, a ratio of control to the yaw moment control is set according to the travel mode selected by the operation of the operation unit 60.

Next, with reference to the flowchart illustrated in FIG. 4, a processing routine executed by the braking control unit 104 in order to perform the behavior stabilization control when it is determined whether or not there is a need to execute the behavior stabilization control and it is determined to be necessary will be described. Further, the processing routine is executed for each preset control cycle.

Figure 4:
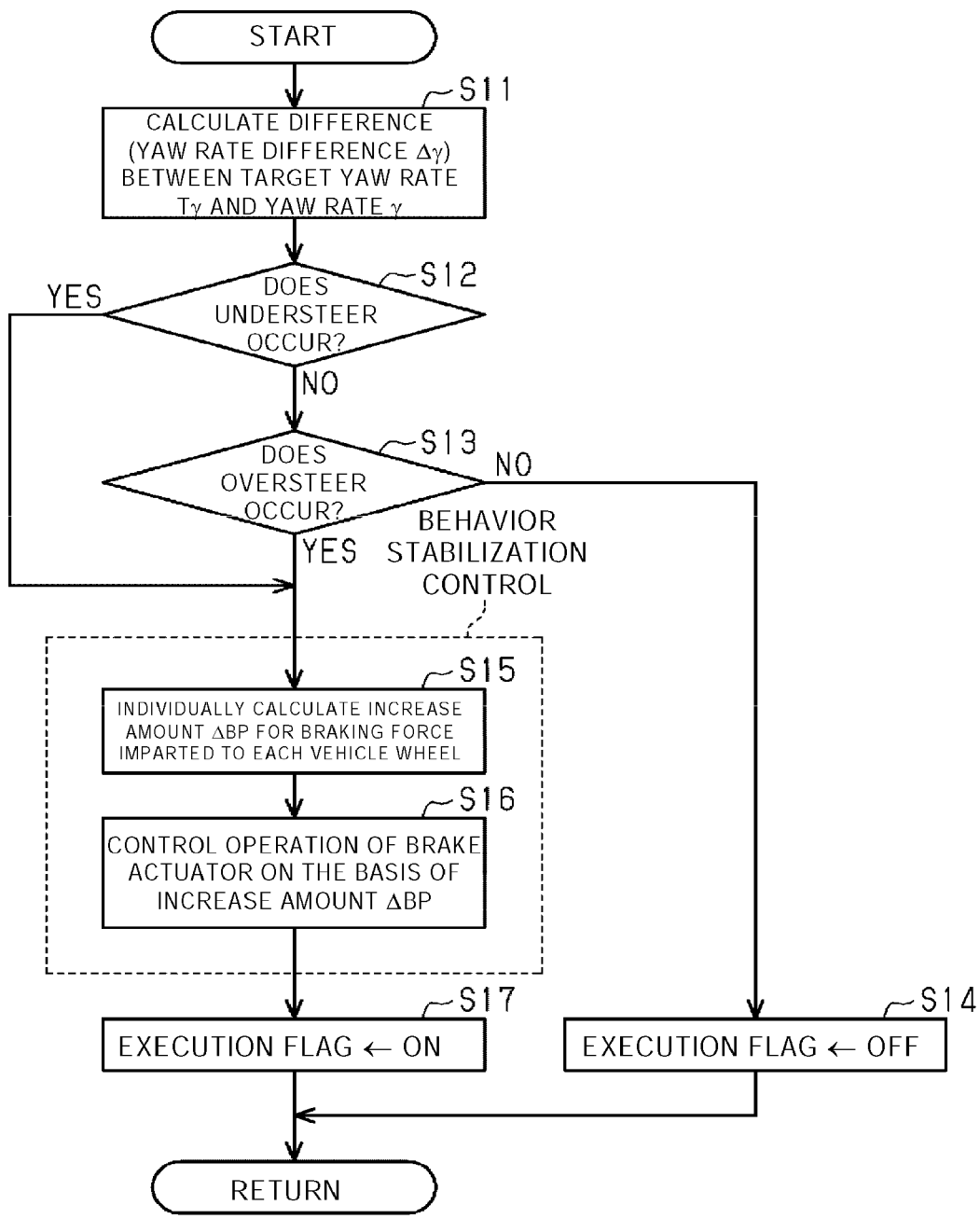
FIG. 4 is a flowchart describing a processing routine executed when performing a behavior stabilization control in the vehicle driving assistance device.

As illustrated in FIG. 4, in the present processing routine, the braking control unit 104 calculates a target yaw rate Tγ which is a control target value of the yaw rate of the vehicle, on the basis of the lateral acceleration Gy detected by the lateral acceleration sensor SE6 and the vehicle body speed VS of the vehicle (step S11). Further, in step S11, the braking control unit 104 subtracts the yaw rate γ detected by the yaw rate sensor SE7 from the calculated target yaw rate Tγ, and sets a difference (=Tγ−γ) thereof as a yaw rate difference Δγ. The yaw rate difference Δγ becomes a positive value in a case where the vehicle exhibits an understeering tendency, and increases as the understeering tendency becomes larger. In addition, the yaw rate difference Δγ becomes a negative value in a case where the vehicle exhibits an oversteering tendency, and decreases as the oversteering tendency becomes larger. That is, it can be said that the yaw rate difference Δγ is an example of the "vehicle behavior value" indicating the deterioration of the stability of the vehicle behavior.

Subsequently, the braking control unit 104 determines whether or not the understeering occurs on the basis of the calculated yaw rate difference Δγ (step S12). Specifically, when the yaw rate difference Δγ is equal to or greater than a determined value Ju, the braking control unit 104 determines that the understeering has occurred, and when the yaw rate difference Δγ is less than the determined value Ju, the braking control unit 104 determines that the understeering has not occurred. That is, the determined value Ju is set to a positive value with which the presence or absence of the occurrence of understeering can be determined on the basis of the results of various experiments or simulations. Further, in a case where it is determined that the understeering has occurred (step S12: YES), the braking control unit 104 shifts the processing to step S15 to be described later. On the other hand, in a case where it is determined that the understeering has not occurred (step S12: NO), the braking control unit 104 shifts the processing to the next step S13.

In step S13, the braking control unit 104 determines whether or not the oversteering has occurred on the basis of the calculated yaw rate difference Δγ. Specifically, when the yaw rate difference Δγ is equal to or smaller than a determined value Jo, the braking control unit 104 determines that the oversteering has occurred, and when the yaw rate difference Δγ is greater than the determined value Jo, the braking control unit 104 determines that the oversteering has not occurred. In other words, the determined value Jo is set to a negative value with which the presence or absence or the occurrence of the oversteering can be determined on the basis of the results of various experiments or simulations. Further, in a case where it is determined that the oversteering has occurred (step S13: YES), the braking control unit 104 shifts the processing to step S15 to be described later. On the other hand, in a case where it is determined that the oversteering has not occurred (step S13: NO), since it is possible to determine that there is no need to execute the behavior stabilization control because the vehicle behavior is stable, the braking control unit 104 sets OFF on an execution flag (step S14). The execution flag is a flag for determining whether or not the behavior stabilization control is being executed, ON is set when the behavior stabilization control is being executed; on the other hand, OFF is set when the behavior stabilization control is not being executed. Thereafter, the braking control unit 104 temporarily terminates the present processing routine.

In step S15, the braking control unit 104 individually calculates an increase amount ΔBP for the braking torque imparted to each of the wheels FR, FL, RR and RL. As the increase amounts ΔBP, values capable of bringing the yaw rate difference Δγ closer to "0" are set. For example, in a case where the understeering has occurred in the vehicle during turning to the right, each increase amount ΔBP is set so that only the braking torque imparted to the right front wheel FR among the right and left front wheels FR and FL increases and the braking torque imparted to the right and left rear wheels RR and RL equally increases. This makes it possible to eliminate the understeering, while decelerating the vehicle. Further, in a case where the oversteering has occurred in the vehicle during turning to the right, each increase amount ΔBP is set so that only the braking torque imparted to the left front wheel FL among the right and left front wheels FR and FL increases and the braking torque imparted to the right and left rear wheels RR and RL equally increases. This makes it possible to eliminate the oversteering, while decelerating the vehicle.

Subsequently, the braking control unit 104 controls the operation of the brake actuator 33 so that the braking torque to be imparted to each of the wheels FR, FL, RR and RL increases by the increase amount ΔBP (step S16). That is, in the present embodiment, each process in steps S15 and S16 corresponds to an example of the behavior stabilization control. In this respect, in the present embodiment, an example of the "first control unit" that executes the vehicle stabilization control is constituted by the braking control unit 104. Further, the braking control unit 104 sets ON in the execution flag (step S17), and thereafter temporarily terminates the present processing routine.

Next, with reference to the flowchart illustrated in FIG. 5, a processing routine executed by the braking control unit 104 in order to implement the turning assist control during turning of the vehicle will be described. Further, this processing routine is executed for each preset control cycle.

Figure 5:
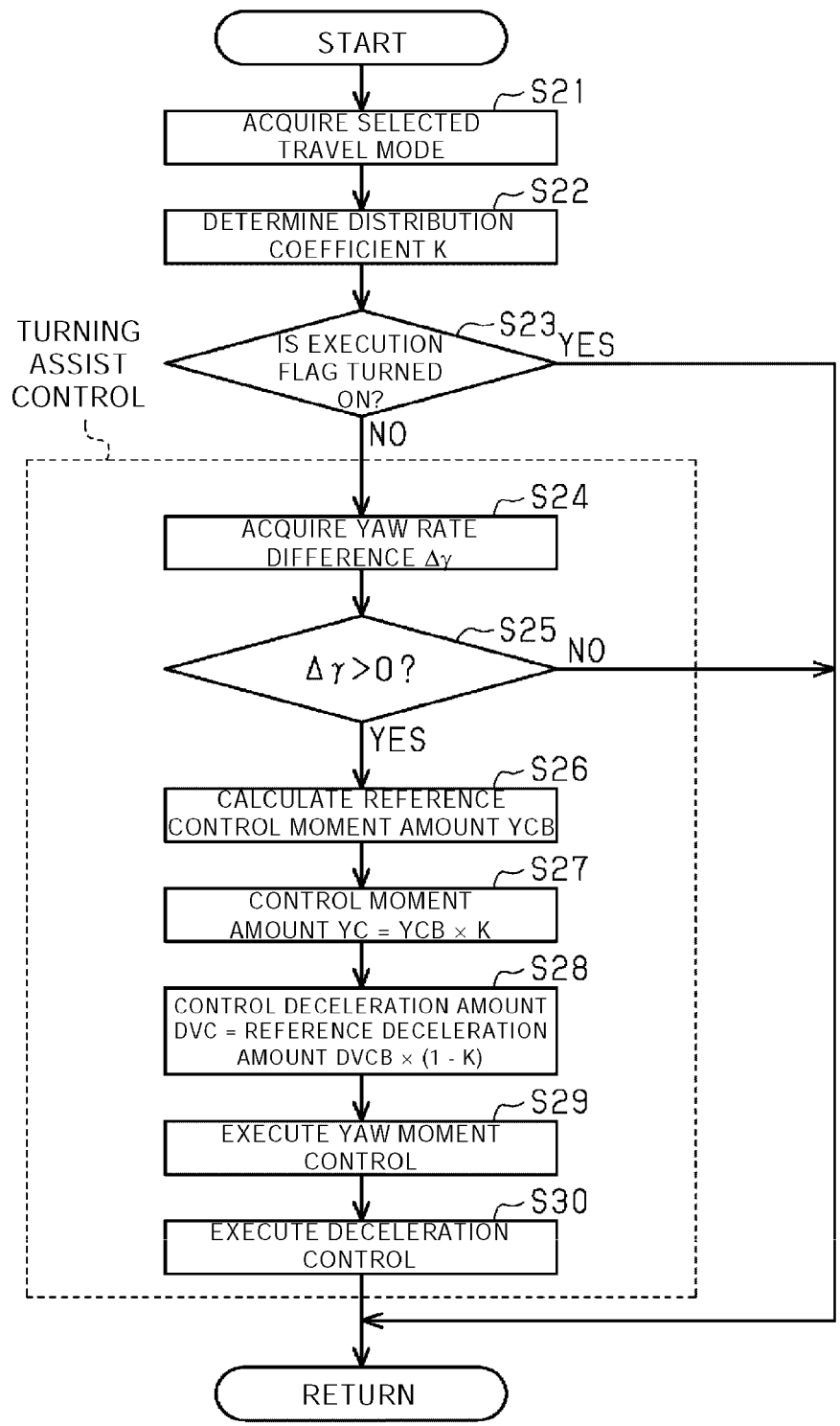
FIG. 5 is a flowchart describing a processing routine executed when performing a turning assist control in the vehicle driving assistance device.

As illustrated in FIG. 5, in the present processing routine, the braking control unit 104 acquires the travel mode selected by the driver through the operation of the operation unit 60 (step S21). Further, the braking control unit 104 determines a distribution coefficient K on the basis of the selected travel mode (step S22). The distribution coefficient K is a coefficient for determining the distribution ratio with respect to the yaw moment control in the turning assist control. As the distribution coefficient K is large, the ratio of control to the yaw moment control increases, and the ratio of control to the deceleration control decreases.

Here, FIG. 3 illustrates a map illustrating a relation between the travel mode and the distribution coefficient K. As illustrated in FIG. 3, in the present embodiment, the distribution coefficient K is determined to a value that is greater than "0" and smaller than "1". That is, when the "SPORT mode" is selected, the distribution coefficient K is determined to a value which is greater than those in a case where other travel modes are selected, specifically, to a value greater than "0.5". On the other hand, when the "SNOW mode" is selected, the distribution coefficient K is determined to a value which is smaller than those in a case where other travel modes are selected, specifically, to a value smaller than "0.5". Further, in a case where the "NORMAL mode" is selected, the distribution coefficient K is determined to a value (for example, an intermediate value) between the value in a case where the "SPORT mode" is selected and the value in a case where the "SNOW mode" is selected.

Returning to FIG. 5, when the distribution coefficient K is determined, the braking control unit 104 determines whether or not ON is set on the execution flag (step S23). In a case where OFF is set on the execution flag (step S23: NO), since it is possible to determine that the behavior stabilization control is not being executed, the braking control unit 104 shifts the processing to the next step S24 in order to perform the turning assist control including each processing after step S24. On the other hand, in a case where ON is set on the execution flag (step S23: YES), since it is possible to determine that the behavior stabilization control is being executed, the braking control unit 104 temporarily terminates the present processing routine, without performing the turning assist control.

In step S24, the braking control unit 104 acquires the yaw rate difference Δγ calculated in step S11. Further, the braking control unit 104 determines whether or not the acquired yaw rate difference Δγ is greater than "0". When the yaw rate difference Δγ is equal to or smaller than "0", it is possible to determine that the vehicle does not exhibit the understeering tendency. On the other hand, when the yaw rate difference Δγ is greater than "0", it is possible to determine that the vehicle exhibits the understeering tendency. Therefore, in a case where the yaw rate difference Δγ is equal to or smaller than "0" (step S25: NO), the braking control unit 104 temporarily terminates the present processing routine, without performing each processing after step S26.

On the other hand, in a case where the yaw rate difference Δγ is greater than "0" (step S25: YES), the braking control unit 104 calculates a reference control moment amount YCB (step S26). Specifically, the braking control unit 104 increases the reference control moment amount YCB as the yaw rate difference Δγ increases. The reference control moment amount YCB is a value used for determining an increase amount of the braking torque to be imparted to the front wheel on the inner side when turning by execution of the yaw moment control. Subsequently, the braking control unit 104 multiplies the calculated reference control moment amount YCB by the distribution coefficient K determined in step S22, and sets the product (=YCB×K) thereof as a control moment amount YC (step S27).

Further, the braking control unit 104 multiplies a difference (=1−K) obtained by subtracting the distribution coefficient K from 1 by a reference deceleration amount DVCB, and sets the product (=DVCB×(1−K)) thereof as a control deceleration amount DVC (step S28). The reference deceleration amount DVCB is a value used for determining a decrease amount of the drive torque transmitted to the front wheels FR and FL which are the drive wheels, by performing the deceleration control.

Subsequently, the braking control unit 104 executes the yaw moment control on the basis of the calculated control moment amount YC (step S29). That is, in the yaw moment control, the braking control unit 104 controls the brake actuator 33 so that the increase amount of the braking torque imparted to the front wheel on the inner side when turning increases as the control moment amount YC increases.

Further, the braking control unit 104 executes the deceleration control on the basis of the calculated control deceleration amount DVC (step S30). That is, in the deceleration control, the braking control unit 104 calculates the decrease amount of the drive torque so that the drive torque output from the engine 12 greatly decreases as the control deceleration amount DVC increases, and sends such a calculation result to the engine control unit 101. Further, the engine control unit 101 that has received such a calculation result controls the driving of the engine 12 so that the drive torque output from the engine 12 is reduced by the decrease amount. Therefore, in the present embodiment, an example of the "second control unit" is constituted by the braking control unit 104 and the engine control unit 101. Thereafter, the braking control unit 104 temporarily terminates the present processing routine.

Next, the operation at the time of turning of the vehicle will be described together with the effects.

When the steering wheel 50 is operated by the driver while the vehicle is traveling, the right and left front wheels FR and FL are steered and the vehicle turns. At this time, when the yaw rate difference Δγ is greater than "0" under the condition that the behavior stabilization control is not being executed, the turning assist control is executed. In other words, when the braking torque imparted to the front wheel on the inner side when turning (the right front wheel FR in the case of the right turning) is increased by the execution of the yaw rate control, the distribution amount of the drive torque to the front wheel on the outer side when turning (the front left wheel FL in the case of the right turning) is increased. Further, the drive torque that is output from the engine 12 is reduced by the execution of the deceleration control. As a result, it is possible to increase the yaw moment of the vehicle, while decelerating the vehicle.

Here, there are cases where the driver selects the "SPORT mode" through the operation of the operation unit 60. The "SPORT mode" is a mode suitable for high-speed traveling as compared with other travel modes that are not selected. When the driver selects the "SPORT mode", there is a possibility that the driver does not desire to greatly reduce the vehicle body speed VS when turning of the vehicle.

Therefore, in the present embodiment, when the "SPORT mode" is selected, since the distribution coefficient K becomes a value greater than "0.5", the vehicle deceleration amount due to the execution of the deceleration control becomes smaller than those in a case where other travel modes are selected. That is, the control deceleration amount DVC becomes smaller than those in a case where other travel modes are selected. Further, the increase amount of the braking torque imparted to the front wheels on the inner side when turning due to the execution of the yaw moment control becomes greater than those in a case where other travel modes are selected. That is, the control moment amount YC becomes greater than those in a case where other travel modes are selected.

As a result, in a case where the "SPORT mode" is selected, even if the turning assist control is executed when the vehicle turns, the vehicle body speed VS of the vehicle is hard to decrease. Moreover, in this case, the distribution amount of the drive torque to the front wheel on the outer side when turning due to the execution of the yaw moment control is greater than those in a case where other travel modes are selected. In other words, the yaw moment of the vehicle can be increased by execution of the yaw moment control. Therefore, while maintaining the vehicle traveling according to the travel mode selected by the driver, that is, while suppressing a decrease in the vehicle body speed VS when the "SPORT mode" is selected, the turning of the vehicle is appropriately assisted by execution of the turning assist control. Therefore, it is possible to appropriately assist the turning of the vehicle by execution of the turning assist control, while suppressing the deterioration of drivability.

On the other hand, the driver may select the "SNOW mode" through the operation of the operation unit 60. In this case, the vehicle may travel on a low μ road such as a snowy road. When the vehicle turns on the low μ road as described above, if a difference between the drive torque to the front wheel on the outer side when turning and the drive torque to the front wheel on the inner side when turning is increased by the execution of the yaw moment control, the yaw moment of the vehicle becomes too large, and there is a risk of deterioration of the stability of the vehicle behavior.

Therefore, in the present embodiment, in a case where the "SNOW mode" is selected, since the distribution coefficient K is a value smaller than "0.5", the increase amount of the braking torque imparted to the front wheel on the inner side when turning due to the execution of the yaw moment control becomes smaller than those in a case where the other travel modes are selected. That is, the control moment amount YC becomes smaller than those in a case where the other travel modes are selected. Also, the deceleration amount of the vehicle due to the execution of the deceleration control becomes larger than those in a case where the other travel modes are selected. That is, the control deceleration amount DVC becomes larger than those in a case where the other travel modes are selected.

Accordingly, in a case where the "SNOW mode" is selected, the distribution amount of the drive torque to the front wheel on the outer side when turning due to the yaw moment control becomes difficult to increase. Therefore, even if the turning assist control is executed at the time of turning of the vehicle, a situation, in which the yaw moment of the vehicle becomes too large and the behavior of the vehicle becomes unstable, is suppressed. In addition, in this case, it is possible to greatly reduce the vehicle body speed VS of the vehicle by the deceleration control. Therefore, when the vehicle turns on a low μ road, the vehicle can be turned, while sufficiently reducing the vehicle body speed VS of the vehicle.

Incidentally, in a case where the "NORMAL mode" is selected, the distribution coefficient K is smaller than that in a case where the "SPORT mode" is selected, and is greater than that in a case where the "SNOW mode" is selected. Therefore, the control moment amount YC is smaller than that in a case where the "SPORT mode" is selected, and is greater than that in a case where the "SNOW mode" is selected. Also, the control deceleration amount DVC is greater than that in a case where the "SPORT mode" is selected, and is smaller than that in a case where the "SNOW mode" is selected.

Further, the above embodiment may be modified to another embodiment as described below.

The number of travel modes that can be selected by operating the operation unit 60 may be an arbitrary number of three or more as long as it is two or more. Even in this case, by setting the distribution coefficient K to a value according to the characteristics of the selected travel mode, it is possible to suppress the deterioration of drivability during the execution of the turning assist control.

The distribution coefficient K in a case where "SPORT mode" is selected may be set to be equal to "1". In this case, the control deceleration amount DVC becomes equal to "0". Therefore, in a case where the turning assist control is executed under the condition that the "SPORT mode" is selected, it is possible to suppress the reduction of the vehicle body speed VS caused by the execution of the deceleration control as much as possible.

The distribution coefficient K in a case where "SNOW mode" is selected may be set to be equal to "0". In this case, the control moment amount YC becomes equal to "0". Therefore, in a case where the turning assist control is executed under the condition that the "SNOW mode" is selected, it is possible to suppress an increase in the yaw moment caused by the execution of the yaw moment control as much as possible.

In the flowchart illustrated in FIG. 5, in step S25, it may be determined whether or not the yaw rate difference Δγ is equal to or greater than a determined value greater than "0". In this case, the determined value is a threshold value for determining whether or not it is necessary to execute the turning assist control.

The reference control moment amount YCB may be fixed at a preset value, irrespective of the yaw rate difference Δγ.

The reference deceleration amount DVCB may be varied on the basis of parameters such as the yaw rate difference Δγ.

The target yaw rate Tγ which is a control target value of the yaw rate of the vehicle may be set as a value calculated on the basis of the steering angle Str detected by the steering angle sensor SE8, and the vehicle body speed VS of the vehicle.

The deceleration control of the turning assist control may be a braking control for increasing the braking torques imparted to the right and left front wheels FR and FL and the right and left rear wheels RR and RL, without lowering the drive torque that is output from the engine 12. However, in a case where the braking torques are imparted to each of the right and left rear wheels RR and RL by the execution of the deceleration control, the increase amount of the braking torque of the right rear wheel RR due to the execution of the deceleration control is set to be equal to the increase amount of the braking torque of the left rear wheel RL due to the execution of the deceleration control. In the case of adopting such a control configuration, an example of the "second control unit" is constituted by the braking control unit 104, and an example of the "vehicle driving assistance device" is constituted by the braking control unit 104.

It goes without saying that the deceleration control may include both the control of lowering the drive torque that is output from the engine 12, and the braking control. In this case, an example of the "second control unit" is constituted by the braking control unit 104 and the engine control unit 101.

The vehicle driving assistance device may be applied to a rear-wheel drive vehicle in which the front wheels FR and FL function as follower wheels and the rear wheels RR and RL function as drive wheels. In this case, at the time of the execution of the yaw moment control, by increasing the braking torque imparted to the rear wheel on the inner side when turning (the right rear wheel RR at the time of the right turning), the distribution amount of the drive torque to the rear wheel on the outer side when turning (the left rear wheel RL at the time of the right turning) is increased.

The vehicle driving assistance device may be applied to a four-wheel drive vehicle in which all the wheels FR, FL, RR and RL function as drive wheels. In this case, at the time of execution of the yaw moment control, the braking torque imparted to at least one of both wheels on the inner side when turning may be increased.

The braking device 30 of the vehicle may be a device (that is, an electric brake) that adjusts the braking torque to be imparted to the wheels, by controlling the force of pressing the brake pad 37 against the disc rotor 36 according to the driving amount of the motor.

The vehicle to which the driving assistance device is applied may be an electric vehicle having a motor as a power source, or may be a hybrid vehicle having both the motor and the engine 12 as a power source.

The operation unit operated when selecting the travel mode is not provided in the vehicle, but may be a portable terminal (for example, a smart phone) brought into a vehicle compartment by an occupant (for example, a driver) of the vehicle. In this case, when the control device 100 receives the operation result of the mobile terminal installed with dedicated application software for setting the characteristics of the vehicle, the braking control unit 104 can acquire the travel mode selected by the operation of the mobile terminal. Therefore, at the time of turning of the vehicle in which the behavior stabilization control is not executed, it is possible to execute the turning assist control according to the selected travel mode.

Next, technical ideas that can be grasped from the above embodiment and another embodiment will be described below.

(a) The first control unit preferably determines whether or not the stability of the vehicle behavior deteriorates on the basis of the vehicle behavior value indicating the deterioration of the stability of the vehicle behavior, and executes the behavior stabilization control when it is determined that the stability of the vehicle behavior deteriorates.

The invention claimed is:

1. A vehicle driving assistance device which is applied to a vehicle in which a vehicle control is performed according to a travel mode selected by operation of an operation unit among a plurality of travel modes, the vehicle driving assistance device comprising:
   a first electronic control unit which executes a behavior stabilization control for enhancing stability of a behavior of the vehicle when the behavior of the vehicle becomes unstable at a time of turning of the vehicle; and
   a second electronic control unit which executes a turning assist control including a yaw moment control for increasing a distribution amount of drive torque to drive wheels on an outer side of the vehicle when turning by imparting braking torque to drive wheels on an inner side of the vehicle when turning, at the time of turning the vehicle in which the behavior stabilization control is not executed, and the turning assist control includes a deceleration control for decelerating the vehicle,
   wherein the second electronic control unit sets an increase amount of the braking torque to be imparted to the drive wheels on the inner side when turning due to the execution of the yaw moment control based on the travel mode selected by the operation of the operation unit, and the second electronic control unit sets a vehicle deceleration amount due to the execution of the deceleration control based on the travel mode selected by the operation of the operation unit.

2. The vehicle driving assistance device according to claim 1, wherein the second electronic control unit sets a distribution coefficient according to the travel mode selected by the operation of the operation unit, and
   the second electronic control unit increases the increase amount of the braking torque to be imparted to the drive wheels on the inner side when turning due to the execution of the yaw moment control when the distribution coefficient is greater than a predetermined value, and the second electronic control unit decreases the vehicle deceleration amount due to the execution of the deceleration control when the distribution coefficient is greater than a predetermined value.

3. The vehicle driving assistance device according to claim 2, wherein, when the travel mode selected by the operation of the operation unit is a mode for relatively high-speed traveling as compared to other travel modes which are not selected,
   the second electronic control unit sets the increase amount of the braking torque imparted to the drive wheels on the inner side when turning due to the execution of the yaw moment control to be greater than those in a case where the other travel modes are selected, and sets the vehicle deceleration amount due to the execution of the deceleration control to be smaller than those in a case where the other travel modes are selected.

4. The vehicle driving assistance device according to claim 3, wherein, when the travel mode selected by the operation of the operation unit is a mode for traveling on a relatively low coefficient of friction road as compared to the other travel modes that are not selected, the second electronic control unit sets the increase amount of the braking torque imparted to the drive wheels on the inner side when turning due to the execution of the yaw moment control to be smaller than those in a case where the other travel modes are selected, and sets the vehicle deceleration amount due to the execution of the deceleration control to be greater than those in a case where the other travel modes are selected.

5. The vehicle driving assistance device according to claim 2, wherein, when the travel mode selected by the operation of the operation unit is a mode for traveling on a relatively low coefficient of friction road as compared to the other travel modes that are not selected, the second electronic control unit sets the increase amount of the braking torque imparted to the drive wheels on the inner side when turning due to the execution of the yaw moment control to be smaller than those in a case where the other travel modes are selected, and sets the vehicle deceleration amount due to the execution of the deceleration control to be greater than those in a case where the other travel modes are selected.

6. The vehicle driving assistance device according to claim 1, wherein, when the travel mode selected by the operation of the operation unit is a mode for relatively high-speed traveling as compared to other travel modes which are not selected, the second electronic control unit sets the increase amount of the braking torque imparted to the drive wheels on the inner side when turning due to the execution of the yaw moment control to be greater than those in a case where the other travel modes are selected, and sets the vehicle deceleration amount due to the execution of the deceleration control to be smaller than those in a case where the other travel modes are selected.

7. The vehicle driving assistance device according to claim 6, wherein, when the travel mode selected by the operation of the operation unit is a mode for traveling on a relatively low coefficient of friction road as compared to the other travel modes that are not selected, the second electronic control unit sets the increase amount of the braking torque imparted to the drive wheels on the inner side when turning due to the execution of the yaw moment control to be smaller than those in a case where the other travel modes are selected, and sets the vehicle deceleration amount due to the execution of the deceleration control to be greater than those in a case where the other travel modes are selected.

8. The vehicle driving assistance device according to claim 1, wherein, when the travel mode selected by the operation of the operation unit is a mode for traveling on a relatively low coefficient of friction road as compared to the other travel modes that are not selected, the second electronic control unit sets the increase amount of the braking torque imparted to the drive wheels on the inner side when turning due to the execution of the yaw moment control to be smaller than those in a case where the other travel modes are selected, and sets the vehicle deceleration amount due to the execution of the deceleration control to be greater than those in a case where the other travel modes are selected.

* * * * *